United States Patent
Iwata et al.

(10) Patent No.: US 12,341,399 B2
(45) Date of Patent: Jun. 24, 2025

(54) MOTOR WITH A STEPPED ROTATING BODY

(71) Applicant: MINEBEA MITSUMI Inc., Nagano (JP)

(72) Inventors: Hitoshi Iwata, Nagano (JP); Naoki Ohsawa, Nagano (JP); Shoma Yamanishi, Nagano (JP); Toshiyuki Nishikata, Nagano (JP); Seiji Mitamura, Nagano (JP); Michihiro Shimizu, Nagano (JP); Yuta Amagi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 259 days.

(21) Appl. No.: 17/595,517

(22) PCT Filed: May 29, 2020

(86) PCT No.: PCT/JP2020/021484
§ 371 (c)(1),
(2) Date: Nov. 18, 2021

(87) PCT Pub. No.: WO2020/241887
PCT Pub. Date: Dec. 3, 2020

(65) Prior Publication Data
US 2022/0200392 A1 Jun. 23, 2022

(30) Foreign Application Priority Data
May 31, 2019 (JP) .................................. 2019-103237

(51) Int. Cl.
*H02K 5/173* (2006.01)
*H02K 7/08* (2006.01)
*H02K 21/22* (2006.01)

(52) U.S. Cl.
CPC ........... *H02K 5/1732* (2013.01); *H02K 7/083* (2013.01); *H02K 21/22* (2013.01); *H02K 2207/03* (2013.01)

(58) Field of Classification Search
CPC ...... H02K 5/1732; H02K 5/161; H02K 7/083; H02K 2207/03; H02K 21/22; H02K 1/187; H02K 1/16; H02K 1/2786
(Continued)

(56) References Cited

U.S. PATENT DOCUMENTS 4,739,427 A * 4/1988 Kilmer ............... G11B 19/2009
5,009,436 A      4/1991 Endo et al.
(Continued)

FOREIGN PATENT DOCUMENTS

CN    102465901 A    5/2012
JP     63-194571 U   12/1988
(Continued)

OTHER PUBLICATIONS

Machine translation of JP-02168835-A. (Year: 1990).*
(Continued)

*Primary Examiner* — Michael Andrews
(74) *Attorney, Agent, or Firm* — Chrisman Gallo Tochtrop LLC

(57) ABSTRACT

To provide a motor capable of meeting a demand for size reduction. The motor includes an axial member, a tubular rotating body rotatable in relation to the axial member, a bearing supporting the rotating body with respect to the axial member, and a stator inside the rotating body. The rotating body preferably includes a tubular member formed of a single member, and a magnet.

8 Claims, 5 Drawing Sheets

(58) Field of Classification Search
USPC .................................................. 310/67 R, 90
See application file for complete search history.

(56) References Cited

U.S. PATENT DOCUMENTS

| | | | | |
|---|---|---|---|---|
| 5,061,868 | A * | 10/1991 | Iwazaki | H02K 29/08 |
| | | | | 310/90 |
| 5,519,270 | A * | 5/1996 | Yamada | H02K 21/12 |
| | | | | 310/43 |
| 5,847,476 | A * | 12/1998 | Elsing | G11B 33/08 |
| | | | | 310/67 R |
| 8,807,967 | B2 | 8/2014 | Takeshita et al. | |
| 2004/0119349 | A1 * | 6/2004 | Nickel-Jetter | H02K 5/1737 |
| | | | | 310/90 |
| 2008/0290747 | A1 | 11/2008 | Nomura et al. | |
| 2012/0107156 | A1 | 5/2012 | Takeshita et al. | |
| 2018/0366999 | A1 | 12/2018 | Clothier et al. | |

FOREIGN PATENT DOCUMENTS

| | | | | |
|---|---|---|---|---|
| JP | H02-14276 | U | | 1/1990 |
| JP | 02168835 | A * | 6/1990 | ............ F16C 33/765 |
| JP | H02-168835 | A | | 6/1990 |
| JP | H04-359649 | A | | 12/1992 |
| JP | H05-15106 | A | | 1/1993 |
| JP | H07-203660 | A | | 8/1995 |
| JP | 2002-136082 | A | | 5/2002 |
| JP | 2004-064800 | A | | 2/2004 |
| JP | 2004-301038 | A | | 10/2004 |
| JP | 2006-074964 | A | | 3/2006 |
| JP | 2009-291031 | A | | 12/2009 |
| JP | 2012-202547 | A | | 10/2012 |
| JP | 2017-063523 | A | | 3/2017 |
| JP | 2018-067991 | A | | 4/2018 |

OTHER PUBLICATIONS

International Search Report for corresponding International Application No. PCT/JP2020/021484 mailed Aug. 25, 2020.
Written Opinion for corresponding International Application No. PCT/JP2020/021484 dated Aug. 25, 2020 and English translation.
Japanese Office action in the corresponding JP application No. 2019-103237, dated Apr. 4, 2023, Machine English translation, 12 pages.
First Office Action dated Mar. 5, 2024 for corresponding Japanese Application No. 2023-104130 and English translation.
First Office Action dated May 12, 2024 for corresponding Chinese Application No. 202080038869.9 and English translation.
First Office Action dated Mar. 11, 2025 for corresponding Japanese Application No. 2024-087727 and English translation.

* cited by examiner

MOTOR WITH A STEPPED ROTATING BODY

TECHNICAL FIELD

The present invention relates to a motor.

BACKGROUND ART

To date, various motors have been developed, manufactured, and used depending on various applications and required performance, but there is a demand for further size reduction. There is also a demand for high torque and size reduction in various other applications. That is, there is a desire for a motor that is small and capable of achieving high performance as a motor.

CITATION LIST

Patent Literature

Patent Document 1: JP 2004-64800 A

SUMMARY OF INVENTION

Technical Problem

Accordingly, the present invention has an object to provide a motor that can meet a demand for size reduction.

Solution to Problem

The above problems are solved by the present invention described below. Specifically, a motor according to the present invention includes
an axial member,
a tubular rotating body rotatable in relation to the axial member,
a bearing supporting the rotating body with respect to the axial member, and
a stator inside the rotating body.
In the motor according to the present invention, the rotating body may include a tubular member formed of a single member, and a magnet.
In the motor according to the present invention, the stator may be fixed to the axial member.
A radial dimension of the stator may be smaller than or equal to a radial dimension of the bearing.
The motor includes two bearings as the bearing, the two bearings being a first bearing and a second bearing.
At this time, the rotating body may include a tubular member formed of a single member, and a magnet, and any one or both of the magnet and the stator may be disposed between the first bearing and the second bearing in an axial direction of the axial member.
The rotating body may include two end parts in the axial direction of the axial member, the first bearing may be fixed to a part of the rotating body at one end part side of one of the two end parts, and the second bearing may be fixed to another part of the rotating body at the other end part side of the two end parts.
The first bearing and the second bearing may be fixed to the rotating body at or near both end parts of the rotating body in the axial direction of the axial member.
A part of the tubular member may be formed of a single member, the part being from a part of the tubular member the first bearing is fixed to, to another part of the tubular member the second bearing is fixed to.

In the motor according to the present invention, the first bearing and the second bearing may be members having the same configuration.

In the motor according to the present invention, a radial dimension of the tubular member at one end part side of the axial member may be larger than a radial dimension of the tubular member at the other end part side of the axial member.

In the motor according to the present invention, it is preferable that the axial member be coaxially fixed to the rotating body.

DESCRIPTION OF EMBODIMENTS

A motor according to embodiments of the present invention will be described below with reference to the drawings.

Figure 1:
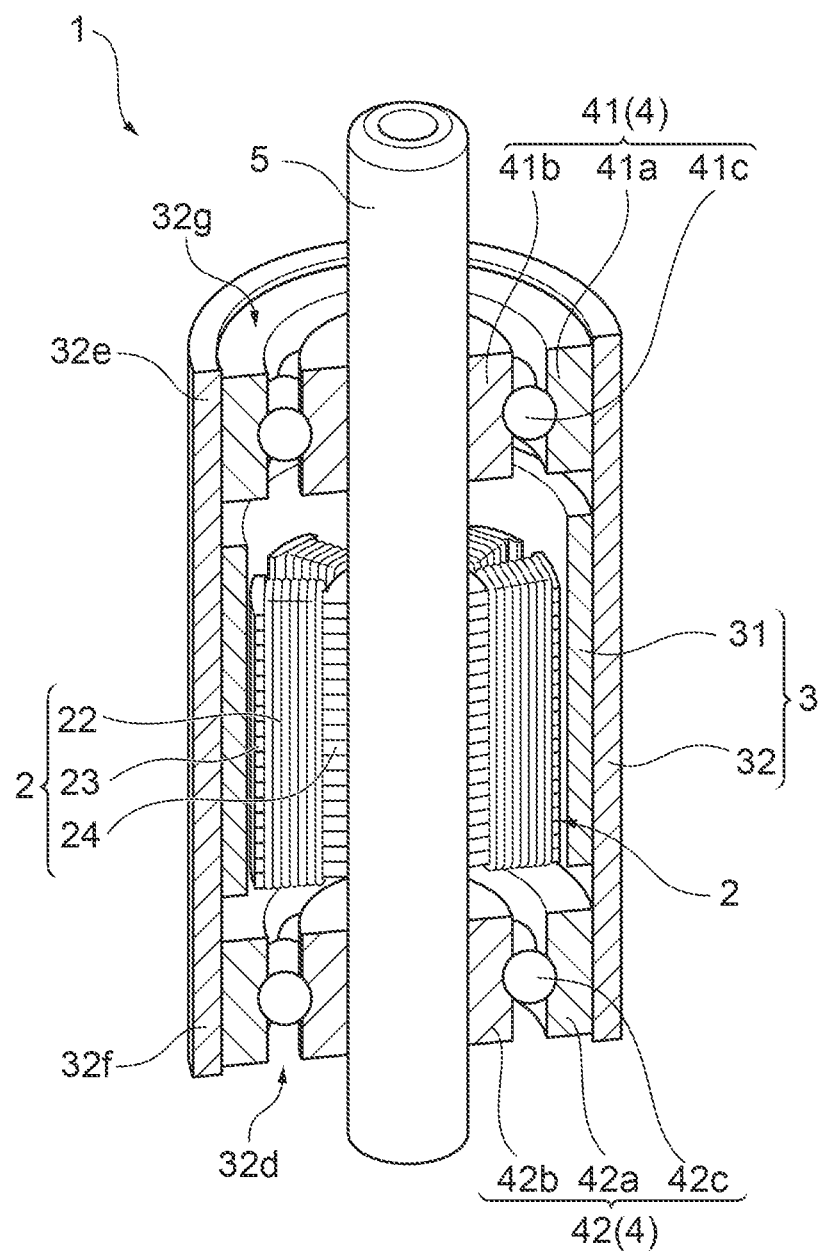
FIG. 1 is a sectional perspective view of a motor according to an embodiment, which is an example of the present invention, viewed obliquely from above.
Figure 2:
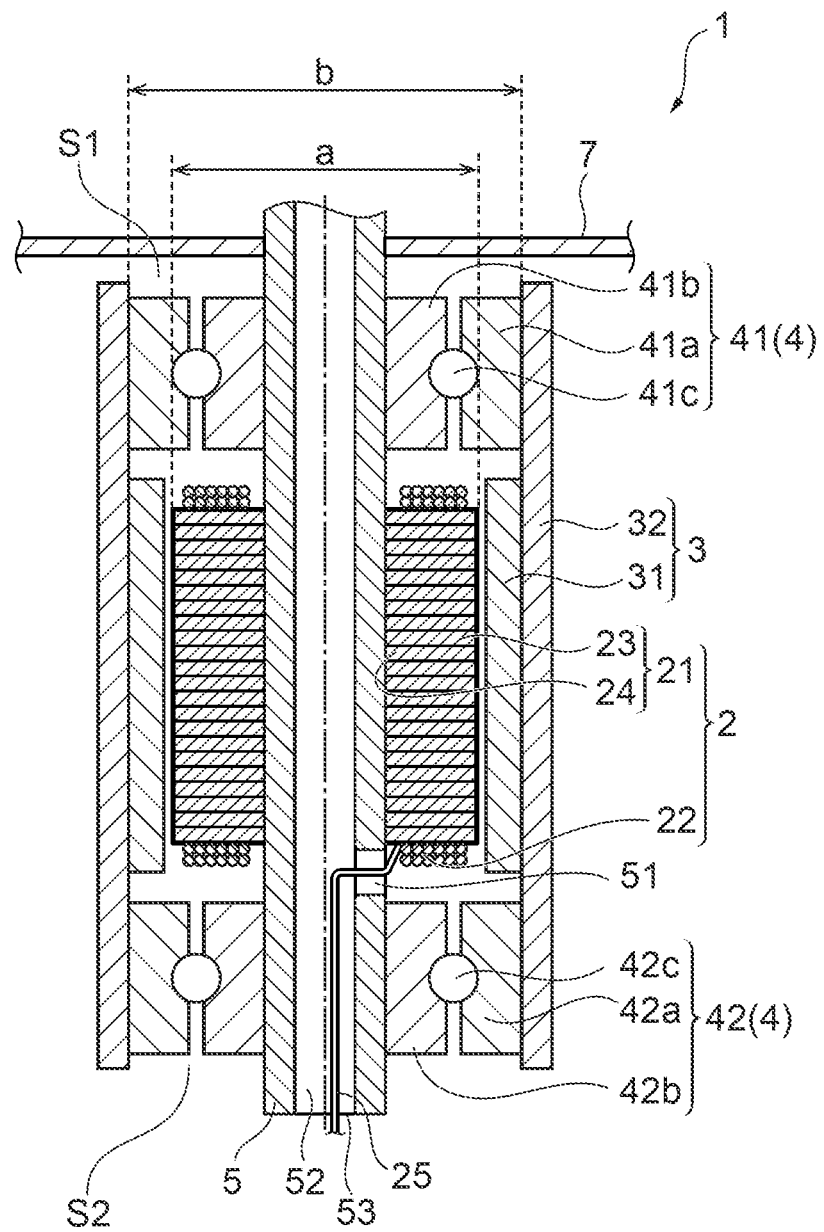
FIG. 2 is a sectional view of the motor according to the embodiment, which is one example of the present invention.

FIG. 1 is a sectional perspective view of a motor 1 according to an embodiment, which is one example of the present invention, viewed obliquely from above, and FIG. 2 is a sectional view of the motor 1.

Note that in the description of the present embodiment, "upper side" and "lower side" refer to an up and down relationship in FIGS. 1 and 2, and do not necessarily correspond to an up and down relationship in the gravitational direction (the same holds for modification examples described below).

In addition, in the description of the present embodiment, a part rotating in the motor 1 may be referred to as a "rotating side", and a part supporting a member at the rotating side and fixed without rotating may be referred to as a "fixed side".

An axial member (column 5) described below of the motor 1 according to the present embodiment is fixed to an attached member 7. The attached member 7 is a target the motor 1 is fixed to, and examples of the attached member 7 can include, for example, a casing (housing) of a motor, a device a motor is attached to (such as an electronic device, an automobile as a moving body, a frame or a substrate of a rotating device and the like). The attached member 7 and the axial member are members at the fixed side.

The axial member and the attached member 7 are members stationary relative to a rotating body described below. Thus, these are collectively referred to as a stationary member (stationary part). Note that as long as the stationary member (stationary part) is stationary in relation to the rotating body, the stationary member (stationary part) does not need to be completely stationary, and may wobble due to rotation of the rotating body. That is, the stationary member has to be stationary only relative to the rotating body. The attached member 7 serves as a mounting member on which the motor 1 is attached when the motor 1 serves as an attached member.

The motor 1 includes a rotor 3 serving as a rotating body, a stator 2 surrounded by the rotor 3, bearings 4, and the column 5 as the axial member.

The stator 2 includes a stator core 21 and coils 22, the stator core 21 having magnetic pole parts 23 fixed to the column 5 and extending radially outward with the column 5 as an axis, and the coils 22 being wound around the magnetic pole parts 23.

The stator core 21 includes an annular part 24 and a plurality of magnetic pole parts 23, the annular part 24 being a laminate body of a silicon steel sheet or the like and being disposed coaxially with the column 5, the plurality of magnetic pole parts 23 being formed to extend radially outward from the annular part 24.

The coil 22 is wound around each of the plurality of stator cores 21. The stator core 21 and the coils 22 are insulated by an insulator (not illustrated) formed of an insulating material. Note that, instead of the insulator, an insulating film may be coated on a surface of the stator core to be insulated from the coils.

The rotor 3 includes a magnet 31 and a tubular member 32, the magnet 31 opposing the magnetic pole parts 23 at an outer peripheral side of the stator 2, and the magnet 31 being attached directly or via another member such as an adhesive to an inner peripheral surface of the tubular member 32. The tubular member 32 has a cylindrical shape centered at an axis of the column 5 and is in a state of surrounding the stator 2. The tubular member 32 is formed of a single member.

The tubular member 32 forming the rotor 3 serving as the rotating body in an axial direction (longitudinal direction) of the column 5 serving as the axial member has a first opening part 32g and a second opening part 32d, the first opening part 32g being at a side of an end part 32e as one of two end parts 32e and 32f, the second opening part 32d being at a side of the end part 32f as the other of the two end parts 32e and 32f. The first opening part 32g is surrounded by one end part 32e and the second opening part 32d is surrounded by the other end part 32f. In the axial direction of the column 5 serving as the axial member, the first opening part 32g and/or the second opening part 32d oppose the spaces S1 and S2 external to the rotor 3 serving as the rotating body.

One end part 32e and/or the other end part 32f of the rotor 3 serving as the rotating body are open, and the members constituting the rotor 3 serving as the rotating body except for the bearings 4 do not cover or are not attached to the end parts 32e and 32f. Thus, the first opening part 32g and the second opening part 32d form an open region with respect to the outer side of the rotor 3 serving as the rotating body. Note that, as necessary, the members constituting the rotor 3 serving as the rotating body except for the bearings 4 may cover or may be attached to one end part 32e and/or the other end part 32f of the rotor 3 serving as the rotating body.

An inner side and outer side of the tubular member 32 communicate with each other via the attached member 7.

The tubular member 32 also has a function of suppressing leakage of a magnetic field from the inner side of the tubular member 32 and is formed of a magnetic material. Note that, the tubular member 32 may be formed with a non-magnetic material such as aluminum or plastic, for example, as long as there is no problem with the characteristics of the tubular member 32.

The magnet 31 is attached to the inner peripheral surface of the tubular member 32 so as to oppose the stator 2. The magnet 31 has an annular shape, and is provided with a region magnetized to the north pole and a region magnetized to the south pole alternately at regular intervals along a circumferential direction. The magnet 31 may be an annular integrally molded member, but a plurality of magnets may be attached in a row to the inner peripheral surface of the tubular member 32 and arranged in a tubular shape. A predetermined magnetic gap G is provided between the magnet 31 and the stator 2. A plurality of the magnetic gaps G are arranged or the magnetic gap G is continuously arranged in the circumferential direction. A predetermined clearance is provided between the magnet 31 and the stator 2 such that the magnetic gap G has at least a constant radial dimension.

The bearings 4 are disposed at both sides of the stator 2 in the axial direction of the column 5, and include two bearings, the two bearings being a first bearing 41 positioned at the upper side and a second bearing 42 positioned at the lower side. In other words, the magnet 31 and the stator 2 are positioned between the first bearing 41 and the second bearing 42 in the axial direction of the column 5. The first bearing 41 and the second bearing 42 are members having the same configuration (shape, structure, size, and material are the same). The first bearing 41 is described below, but the same applies to the second bearing 42. The lengths of two bearings 4 in the axial direction of the column 5 serving as the axial member are the same as or larger than differences between outer diameters and inner diameters of the two bearings 4 in a radial direction of the column 5 serving as the axial member.

The first bearing 41 is a so-called ball bearing having an outer peripheral ring 41a, an inner peripheral ring 41b, and bearing balls 41c interposed between the outer peripheral ring 41a and the inner peripheral ring 41b. The bearing balls 41c roll between the outer peripheral ring 41a and the inner peripheral ring 41b, so that a rotational resistance of the inner peripheral ring 41b with respect to the outer peripheral ring 41a is significantly reduced. The first bearing 41 is formed with a hard metal, such as iron, or a ceramic, for example, in consideration of its function. The length of the first bearing 41 in the axial direction of the column 5 serving as the axial member is the same as or larger than the difference between the outer diameter and the inner diameter of the first bearing 41 in the radial direction of the column 5 serving as the axial member.

The second bearing 42 is a so-called ball bearing having an outer peripheral ring 42a, an inner peripheral ring 42b, and bearing balls 42c interposed between the outer peripheral ring 42a and the inner peripheral ring 42b. The bearing balls 42c roll between the outer peripheral ring 42a and the inner peripheral ring 42b, so that a rotational resistance of the inner peripheral ring 42b with respect to the outer peripheral ring 42a is significantly reduced. The second bearing 42 is formed with a hard metal, such as iron, or a ceramic, for example, in consideration of its function. The length of the second bearing 42 in the axial direction of the column 5 serving as the axial member is the same as or larger than the difference between the outer diameter and the inner diameter of the second bearing 42 in the radial direction of the column 5 serving as the axial member.

The outer peripheral ring 41a of the first bearing 41 and the outer peripheral ring 42a of the second bearing 42 are fixed to the inner peripheral surface of both end parts of the tubular member 32. The outer peripheral ring 41a of the first bearing 41 and the outer peripheral ring 42a of the second bearing 42 oppose the stator 2 in the axial direction of the column 5 serving as the axial member. On the other hand, the inner peripheral ring 41b of the first bearing 41 and the inner peripheral ring 42b of the second bearing 42 are fixed to a peripheral surface of the column 5. The inner peripheral ring 41b of the first bearing 41 and the inner peripheral ring 42b of the second bearing 42 oppose the magnet 31 in the axial direction of the column 5 serving as the axial member.

This allows the rotor 3 to be rotatable with respect to the column 5. The rotor 3 is configured to be rotatable about the axis of the column 5 as a center axis.

As illustrated in FIG. 2, in the present embodiment, a radial dimension b as a dimension of the bearing 4 (first bearing 41) in the radial direction is larger than a radial dimension a, the radial dimension a being the dimension of the stator 2 in the radial direction (b>a).

The column 5 is formed with aluminum, for example, into a hollow state (more specifically, a tubular state) for weight reduction. In the present embodiment, the column 5 is a member at the fixed side. The column 5 is a member having a function of fixing and supporting the entire motor 1, and thus, required to have rigidity corresponding to the function.

An opening part 51 is provided at the middle of the column 5, and a lead wire 25 connected to the coil 22 is drawn from the opening part 51 into a cavity 52 inside the column 5, and is pulled out of the motor 1 from an end opening part 53 of the column 5.

In the motor 1 according to the present embodiment, the tubular member 32 is closed at both end parts by the first bearing 41 and the second bearing 42. The coil 22 of the stator 2 in this enclosed space is externally powered.

In the motor 1 according to the present embodiment, the lead wire 25 is passed through the cavity 52 inside the column 5, thereby electrically connecting the inside of the space enclosed by the tubular member 32, the bearing 4, and the like, to the outside of the space. Therefore, the lead wire 25 can power the coil 22 of the stator 2 in the enclosed space.

The motor 1 configured as described above has the rotor 3 rotatable with respect to the stator 2 fixed to the column 5 and surrounding the stator 2, and constitutes a so-called outer rotor type brushless motor. However, in a typical outer rotor type brushless motor, a shaft fixed to a rotor rotates and the shaft extracts a rotational force, whereas in the motor 1 according to the present embodiment, the column 5 having the axis coinciding with the center axis of the rotation of the rotor 3 is a member at the fixed side, and is configured so that the rotational force is directly extracted from the rotor 3.

The tubular member 32 being formed of a single member allows the center axes of the first bearing 41 and the second bearing 42 to be coaxial with the column 5.

In a case where the tubular member 32 is formed of a plurality of members, a plurality of tolerances for the plurality of members constituting the tubular member 32 and the first bearing 41 and the second bearing 42 may be considered. However, the tubular member 32 being formed of a single member allows the number of considered tolerances to be reduced and makes it easy to coaxially match the center axes of the first bearing 41 and the second bearing 42 with the column 5.

The attached member 7 is a member the motor 1 is fixed to, and is formed with plastic, metal, or the like, for example. The attached member 7 is depicted in a flat plate shape in the drawings, but this is just an example assuming that the region around the part where the motor 1 is attached is flat, and the attached member 7 may have various shapes depending on what the attached member 7 itself is. The region around the part where the motor 1 is attached need not be flat.

In the motor 1 according to the present embodiment, the column (axial member) 5 is fixed coaxially to the attached member 7. In the motor 1 according to the present embodiment, the column (axial member) 5 is fixed coaxially to the rotor 3 serving as the rotating body.

The motor 1 according to the present embodiment includes the column 5 at the fixed side and the rotor 3 serving as the rotating body that rotates with respect to the column 5 via the bearing 4, and thus, as illustrated in FIG. 2, the radial dimension a of the stator 2 can be made smaller than the radial dimension b of the bearing 4 (b>a). This allows the stator 2 to be made very small.

In a conventional outer rotor type brushless motor in which a rotating body corresponding to the rotor 3 and a shaft corresponding to the column 5 are fixed and rotate together, a bearing must be arranged between a stator at the fixed side located inside the rotating body and the shaft, and thus, the radial dimension a of the stator is necessarily larger compared with the radial dimension b of the bearing 4 (b<a).

However, with the construction of the present invention, it is possible to make the radial dimension a of the stator smaller than the radial dimension b of the bearing (b>a), or to make both the same (b=a), and thus, size reduction of the entire motor can be achieved.

In a case where the axial member for extracting the rotational force does not need to protrude from the motor, further size reduction and space saving can be achieved.

In a conventional motor with a rotating axial member protruding from the motor, since the rotating axial member rotates with the one side of the axial member being supported, and the rotational force is extracted from the protruding other end side, deviation of rotation is likely to occur; however, in the motor 1 according to the present embodiment, the rotor 3 itself, supported by the bearing 4, rotates as the rotating body, and thus, the rotation of the rotor 3 is stabilized.

In the motor 1 according to the present embodiment, since the first bearing 41 and the second bearing 42 are fixed respectively to both end parts of the rotor 3, and the rotor 3 serving as the rotating body is supported, the rotation of the rotor 3 is stabilized with respect to the column 5. In particular, since the magnet 31 as a component of the rotor 3 serving as the rotating body and having a predetermined weight is disposed between the first bearing 41 and the second bearing 42 rotatably supporting the rotor 3 in the axial direction of the column 5, the rotation of the rotor 3 is stabilized.

Note that, the bearings are more preferably disposed at both end parts of the rotating body as in the present embodiment; however, as long as the bearings are near both end parts of the rotating body, the rotation of the rotating body with respect to the axial member is sufficiently stable. The term "near" referred to here means a position near each of both end parts of the rotating body, and cannot be expressly defined by a numerical value, and, for example, a region with a length of 20% from each of both end parts in the axial direction of the rotating body, preferably a region with a length of 10% from each of both end parts, is included in the concept of "near both end parts".

Furthermore, in the motor 1 according to the present embodiment, the first bearing 41 and the second bearing 42 are members having the same configuration, and thus, the rotation of the rotor 3 is stabilized.

As described above, in the motor 1 according to the present embodiment, deviation of rotation of the rotor 3 is unlikely to occur and high precision stabilization can be achieved.

The stabilization of the rotation of the rotor 3 means that deviation of rotation is less likely to occur, and thus, the motor 1 can achieve a high torque. In other words, the motor 1 according to the present embodiment can provide excellent basic characteristics as a motor while achieving size reduction.

Next, a motor 1a according to a first modification example of the present invention will be described with reference to the drawings.

Figure 3:
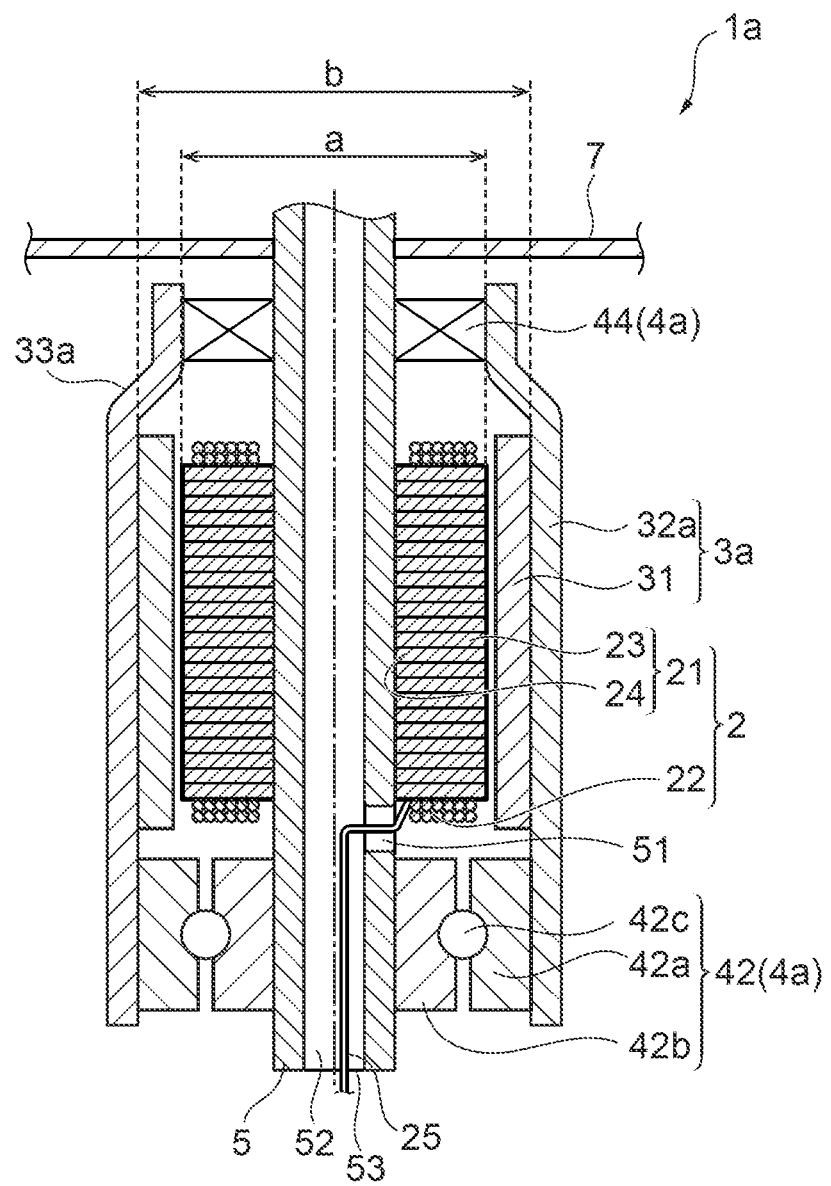
FIG. 3 is a sectional view of a motor according to a first modification example, which is another example of the present invention.

FIG. 3 is a sectional view of the motor 1a according to the first modification example, which is one example of the present invention. FIG. 3 is a sectional view taken along a section at a position substantially the same as that in FIG. 2. In the description of the present modification example, members or components having the functions and structures in FIG. 3 the same as those of the above-described embodiment are denoted by the same reference signs as those in the above-described embodiment, and detailed descriptions thereof are omitted (unless a particular description is given).

In the present modification example, the configurations of a bearing 4a and a rotor 3a serving as the rotating body are different from those of the bearing 4 and the rotor 3 according to the above-described embodiment.

As illustrated in FIG. 3, the bearing 4a in the present modification example includes the second bearing 42 the same as the above-described embodiment at the lower side and a slide bearing 44 at the upper side.

Compared to a bearing serving as a rolling bearing, the slide bearing 44 is easier to reduce in size and diameter and is suitable for high-speed rotation. Therefore, it can be said that the slide bearing 44 is suitable for use in the members of the motor of the present invention.

As illustrated in FIG. 3, the slide bearing 44 is flat and both the inner diameter and the outer diameter thereof can be made smaller, so that the outer diameter is smaller than that of the second bearing 42.

In the present modification example, a tubular member 32a of the rotor 3a has a stepped part 33a near an upper end in the axial direction, and the outer diameter above the stepped part 33a is reduced to be smaller than the outer diameter below the stepped part 33a. The tubular member 32a of the rotor 3a corresponds to the slide bearing 44 having a small outer diameter. Furthermore, the outer diameter of the slide bearing 44 is fixed to the inner peripheral surface of the tubular member 32a having the reduced inner diameter. In other words, the radial dimension of the tubular member 32a at one end part side of the column (axial member) 5 is larger than the radial dimension of the tubular member 32a at the other end part side of the column (axial member) 5.

In the present modification example, as illustrated in FIG. 3, size reduction in an up/down direction (axial direction) is attained, and the diameter of the rotor 3a is narrower at the upper side, achieving further size reduction compared with the above-described embodiment. Although the bearings 4a are different at the upper and lower sides, the rest of the configuration of the motor 1a is the same as that of the motor 1 according to the above-described embodiment, so the rotation can be stabilized.

As illustrated in FIG. 3, in the present modification example also, the radial dimension b, which is the dimension of the bearing 4a (second bearing 42) in the radial direction, is larger than the radial dimension a, which is the dimension of the stator 2 in the radial direction (b>a).

Note that even if a bearing the same as the slide bearing 44 is used for the bearing 4a at the lower side instead of the second bearing 42, a tubular member formed into a cylindrical shape having a small overall diameter is used instead of the tubular member 32a having the diameter reduced at the upper side, and a stator having a diameter smaller than the inner diameter of the tubular member is used instead of the stator 2, the radial dimension b of the bearing is larger than the radial dimension a of the stator (b>a). In this case, the outer diameter of the rotor can be further reduced, and further size reduction can be achieved.

Next, a motor 1b according to a second modification example of the present invention will be described with reference to the drawings.

Figure 4:
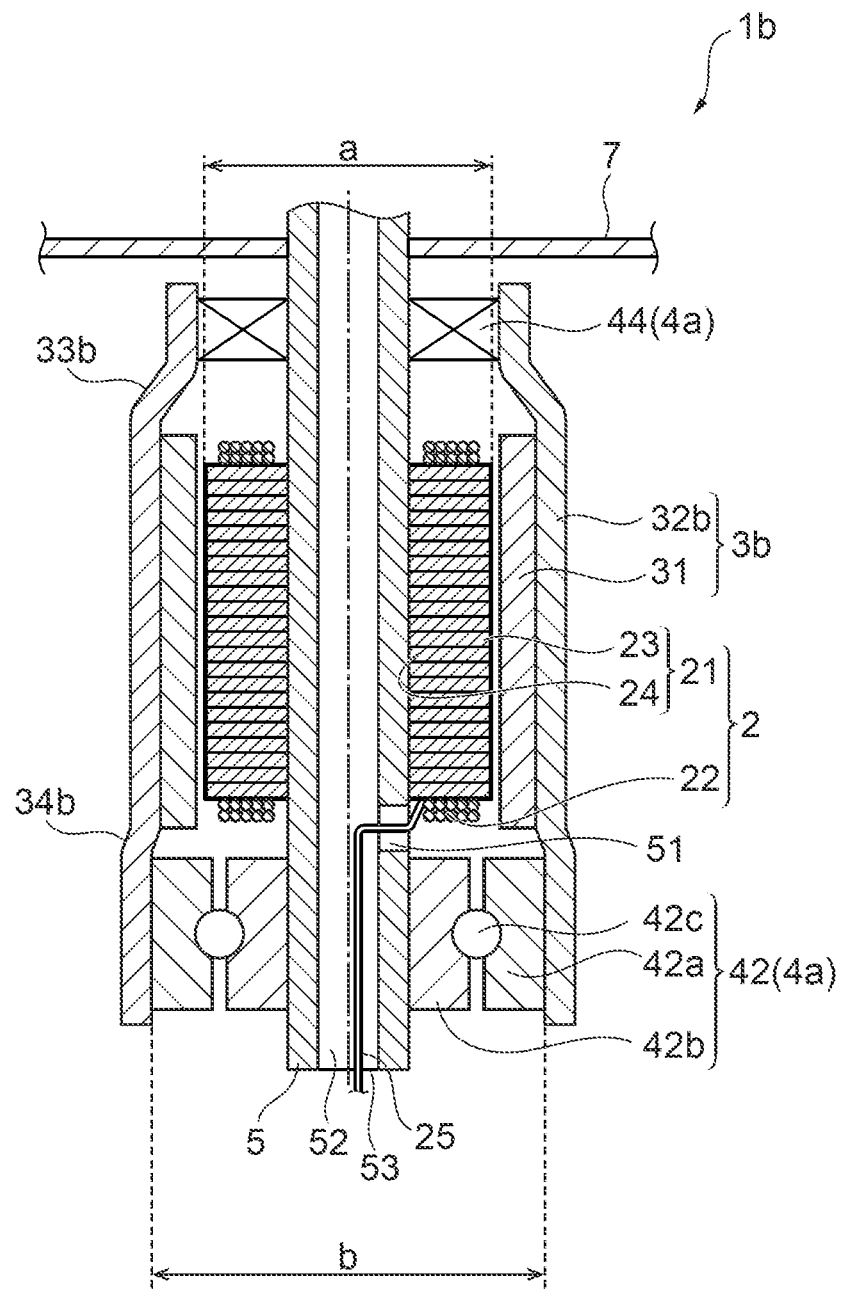
FIG. 4 is a sectional view of a motor according to a second modification example, which is further another example of the present invention.

FIG. 4 is a sectional view of the motor 1b according to the second modification example, which is one example of the present invention. FIG. 4 is a sectional view taken along a section at a position substantially the same as those in FIG. 2 and FIG. 3. In the description of the present modification example, members or components having the functions and structures in FIG. 4 the same as those of the above-described embodiment and the first modification example are denoted by the same reference signs as those in the above-described embodiment and the first modification example, and detailed descriptions thereof are omitted (unless a particular description is given).

In the present modification example, similar to the above-described first modification example, as the bearing 4a, the second bearing 42 at the lower side is the same as in the above-described embodiment, and the slide bearing 44 is employed at the upper side; however, the configuration of a rotor 3b serving as the rotating body is different from that of the rotor 3a according to the above-described first modification example. In the present modification example, a tubular member 32b of the rotor 3b has a stepped part (first stepped part 33b) near an upper end in the axial direction as well as a stepped part (second stepped part 34b) near a lower end. In other words, in the present embodiment, a difference in the outer diameters of the second bearing 42 and the slide bearing 44 is adjusted by two-step diameter reduction at the first stepped part 33b and the second stepped part 34b.

In the present embodiment, the tubular member 32b has an inner diameter in a region near a lower end in the axial direction of the tubular member 32b that is sufficient to allow the second bearing 42 having a large outer diameter to be press-fitted and fitted, and the diameter is reduced at the second stepped part 34b so that the outer diameter is smaller above the second stepped part 34b. Then, the diameter is further reduced at the first stepped part 33b positioned similar to the stepped part 33a according to the first modification example, and thus, the outer diameter is further smaller above the first stepped part 33b corresponding to the slide bearing 44 having a small outer diameter. Because the difference in the outer diameters of the bearing 4a is adjusted by two-step diameter reduction, the first stepped part 33b is positioned similar to the stepped part 33a according to the first modification example, but has a more gradual degree of diameter reduction than the stepped part 33a.

In the present embodiment, the first stepped part 33b and the second stepped part 34b being provided allows the center axes of the second bearing 42 and the slide bearing 44 to be arranged coaxially with the center axis of the tubular member 32b (depicted by a dash-dot-dash line in the drawing) with a small number of intersections. When the second bearing 42 is press-fitted from the opening at the lower side of the tubular member 32b, the second bearing 42 is positioned by the second stepped part 34b, which makes manufacture easier and also improves accuracy.

Note that as illustrated in FIG. 4, in the present modification example also, the radial dimension b, which is the dimension of the bearing 4a (second bearing 42) in the radial direction, is larger than the radial dimension a, which is the dimension of the stator 2 in the radial direction (b>a).

Next, a motor 1c according to a third modification example of the present invention will be described with reference to the drawings.

Figure 5:
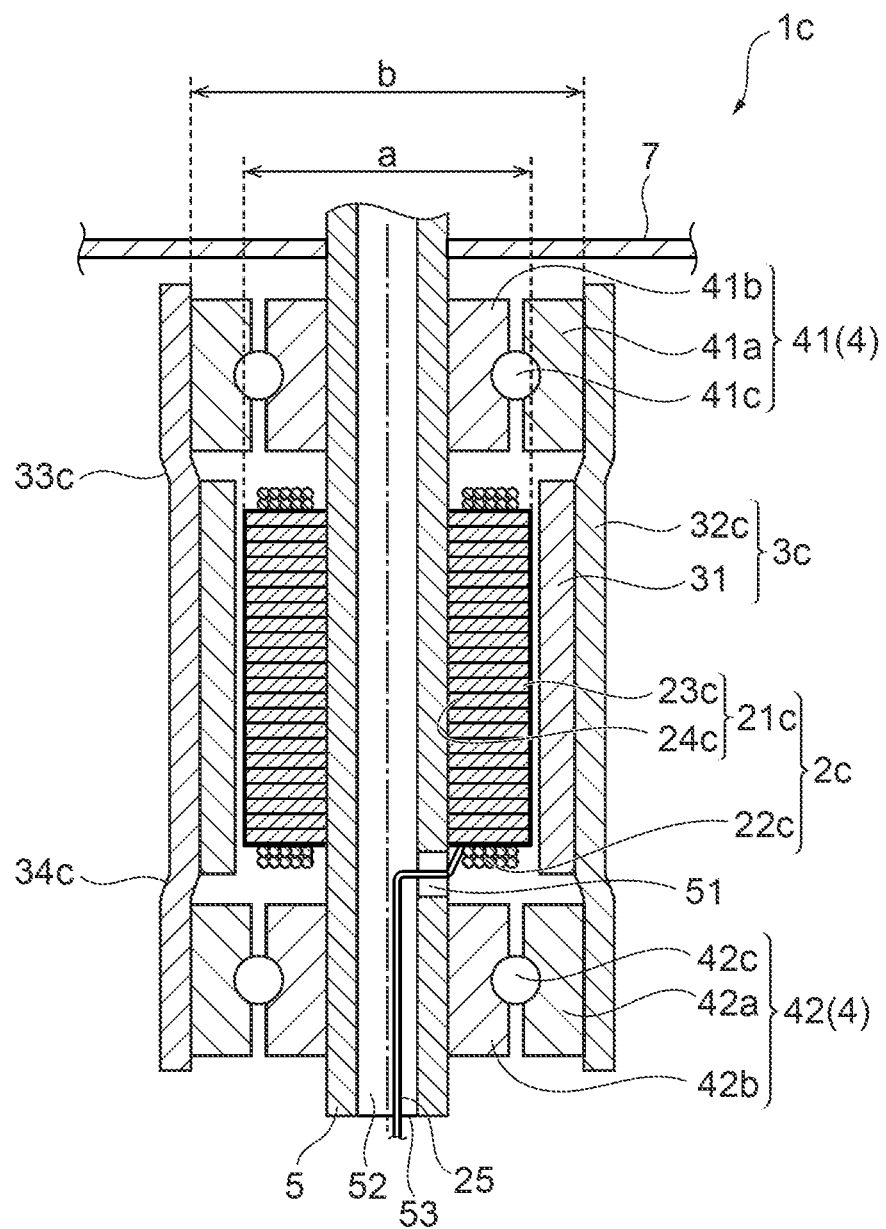
FIG. 5 is a sectional view of a motor according to a third modification example, which is further another example of the present invention.

FIG. 5 is a sectional view of the motor 1c according to the third modification example, which is one example of the present invention. FIG. 5 is a sectional view taken along a section at a position substantially the same as those in FIGS. 2 to 4. In the description of the present modification example, members or components having the functions and structures in FIG. 5 the same as those of the above-described embodiment are denoted by the same reference signs as those in the above-described embodiment, and detailed descriptions thereof are omitted (unless a particular description is given).

In the present modification example, unlike the first modification example and the second modification example, the bearings 4 have the same configuration as in the above-described embodiment. In the present modification example, the configurations of a stator 2c and a rotor 3c serving as the rotating body are different from those of the stator 2 and the rotor 3 according to the above-described embodiment.

In the present modification example, in the stator 2c, a magnetic pole part 23c has a length in the radial direction shorter than that of the magnetic pole part 23 according to the above-described embodiment, and thus, a winding width of a coil 22c is also short compared with the coil 22 according to the above-described embodiment. As such, the radial dimension a, which is a dimension of the stator 2c in the radial direction, is short compared with the stator 2 according to the above-described embodiment.

As described above, because the bearing 4 has the same configuration as the above-described embodiment, the inner diameter of a part of a tubular member 32c corresponding to the bearing 4 is the same as that of the tubular member 32 according to the above-described embodiment; however, the inner diameter of a part of the tubular member 32c corresponding to the stator 2c is required to be small compared with the tubular member 32 according to the above-described embodiment.

In the present modification example, a difference between the inner diameter of a part of the tubular member 32c corresponding to the bearing 4 and the inner diameter of a part of the tubular member 32c corresponding to the stator 2c is adjusted by two stepped parts (a first stepped part 33c and a second stepped part 34c) above and below the tubular member 32c in the axial direction (depicted by a dash-dot-dash line in FIG. 5).

In the present modification example, the tubular member 32c has an inner diameter that is sufficient to allow the first bearing 41 and the second bearing 42, which have a large outer diameter, to be press-fitted and fitted in regions near the upper and lower end, and the inner diameter in a region between the first bearing 41 and the second bearing 42 is smaller so as to correspond to the stator 2c.

In other words, the tubular member 32c has a larger inner diameter in the region where the first bearing 41 is press-fitted, and the diameter is reduced at the first stepped part 33c so that the inner diameter at the region corresponding to the stator 2c is smaller. Then, the tubular member 32c is again increased in diameter at the second stepped part 34c so that the inner diameter is larger in a region where the second bearing 42 is press-fitted. At this time, the inner diameter of the tubular member 32c in the region where the first bearing 41 is press-fitted and the inner diameter of the tubular member 32c in the region where the second bearing 42 is press-fitted are the same.

In the present modification example, the first stepped part 33c and the second stepped part 34c can optimally adjust the inner diameter of the tubular member 32c in the axial direction at the part corresponding to the bearing 4 and the part corresponding to the stator 2c. This makes it possible to reduce the diameter of the part corresponding to the stator 2c in the axial direction of the tubular member 32c.

Note that as illustrated in FIG. 5, in the present modification example also, the radial dimension b, which is a dimension of the bearing 4 (first bearing 41 and second bearing 42) in the radial direction, is larger than the radial dimension a, which is a dimension of the stator 2c in the radial direction (b>a).

As described above, the motor according to the present invention is described with reference to the preferred embodiment and the modification examples, but the motor according to the present invention is not limited to the configuration of the above-described embodiment and modification examples. For example, in the above-described embodiment and third modification example, the first bearing 41 and the second bearing 42 are members having the same configuration, but may be members having different configurations (different shapes, different structures, different sizes, and different materials) without limitation.

In the motor according to the above-described present embodiment, the first bearing 41 and the second bearing 42 are fixed respectively to both end parts of the rotor, but are not limited to this configuration. The first bearing 41 may be fixed to a part of the rotor 3 and the second bearing 42 may be fixed to another part of the rotor 3, both parts being located on the magnet 31 side with respect to both end parts of the rotor 3. Even in such an aspect, since the rotor 3 serving as the rotating body is supported, the rotation of the rotor 3 with respect to the column 5 is stabilized.

One end part of each of the tubular members 32, 32a, 32b, and 32c included in the motor 1 according to the above-described embodiment or modification examples may be narrowed, the first bearing 41 may be fixed to a part, on the rotor 3 side with respect to the one end part, of each of the tubular members 32, 32a, 32b, and 32c, and the second bearing 42 may be fixed to another part, at the other end part or on the rotor 3 side with respect to the other end part, of each of the tubular members 32, 32a, 32b, and 32c, respectively.

Note that the arrangement of the first bearing 41 and the second bearing 42 is not limited to the aspect of the above-described embodiment, and may be in the order of the first bearing 41 and the second bearing 42, or in the order of the second bearing 42 and the first bearing 41.

As described above, the rotating body may include two end parts in the axial direction of the axial member, the first bearing may be fixed to a part of the rotating body at one end part side of the two end parts, and the second bearing may be fixed to another part of the rotating body at the other end part side of the two end parts.

In the motor according to the above-described embodiment or modification examples, as for the tubular members 32, 32a, 32b, and 32c, at least a part of each of the tubular members 32, 32a, 32b, and 32c is formed of a single member, the part being from a part, the first bearing 41 (or the slide bearing 44) is fixed to, of each of the tubular members 32, 32a, 32b, and 32c to another part, the second bearing 42 is fixed to, of the tubular members 32, 32a, 32b, and 32c.

In the motor according to the above-described embodiment or modification examples, as for the tubular members 32, 32a, 32b, and 32c, at least a part of each of the tubular members 32, 32a, 32b, and 32c may have substantially the same radial dimension, the part being from a part, the first bearing 41 (or the slide bearing 44) is fixed to, of each of the tubular members 32, 32a, 32b, and 32c to another part, the second bearing 42 is fixed to, of the tubular members 32, 32a, 32b, and 32c.

In the above-described embodiment and modification examples, the tubular members 32, 32a, 32b, and 32c are formed of a single member, but are not limited to a single member, and the tubular members may be formed of a plurality of members as necessary.

In addition, the motor according to the present invention may be appropriately modified by a person skilled in the art according to conventionally known knowledge. Such modifications are of course included in the scope of the present invention as long as these modifications still include the configuration of the present invention.

REFERENCE SIGNS LIST 1, 1a, 1b, 1c Motor
2, 2c Stator
3, 3a, 3b, 3c Rotor (rotating body)
4, 4a Bearing
5 Column (axial member)
7 Attached member
21, 21c Stator core
22, 22c Coil
23, 23c Magnetic pole part
24, 24c Annular part
25 Lead wire
31 Magnet
32, 32a, 32b, 32c Tubular member
33a Stepped part
33b, 33c First stepped part
34b, 34c Second stepped part
41 First bearing (bearing)
41a, 42a Outer peripheral ring
41b, 42b Inner peripheral ring
41c, 42c Bearing ball
42 Second bearing (bearing)
43 Ring member
44 Slide bearing
51 Opening part
52 Cavity
53 End opening part

The invention claimed is:

1. A motor comprising:
an axial member;
a tubular rotating body rotatable in relation to the axial member;
a first bearing supporting a first part of the rotating body with respect to the axial member; a second bearing supporting a second part of the rotating body with respect to the axial member;
a stator inside the rotating body; and
a magnet fixed at a third part of the rotating body; wherein
the stator is fixed at the axial member,
a radial dimension of the first bearing and a radial dimension of the second bearing are larger than a radial dimension of the magnet,
an outer surface of the rotating body includes
a first stepped part between an outer surface of the third part of the rotating body and an outer surface of the first part of the rotating body in an axial direction of the axial member, and
a second stepped part between the outer surface of the third part of the rotating body and an outer surface of the second part of the rotating body in the axial direction of the axial member, and
a radial dimension of the outer surface of the third part of the rotating body is smaller than a radial dimension of the outer surface of the first part of the rotating body and a radial dimension of the outer surface of the second part of the rotating body.

2. The motor according to claim 1, wherein
the magnet and the stator are disposed between the first bearing and the second bearing in an axial direction of the axial member.

3. The motor according to claim 1, wherein
the rotating body includes a first end part and a second end part in the axial direction of the axial member,
the first bearing is fixed to the first part of the rotating body at the first end part side, and
the second bearing is fixed to the second part of the rotating body at the second end part side.

4. A motor comprising:
an axial member;
a tubular rotating body rotatable in relation to the axial member;
a first bearing supporting a first part of the rotating body with respect to the axial member;
a second bearing supporting a second part of the rotating body with respect to the axial member;
a stator inside the rotating body; and
a magnet fixed at a third part of the rotating body, wherein
the stator is fixed at the axial member, and
a radial dimension of an inner surface of the first part of the rotating body and a radial dimension of an inner surface of the second part of the rotating body are larger than a radial dimension of an inner surface of the third part of the rotating body,
an outer surface of the rotating body includes
a first stepped part between an outer surface of the third part of the rotating body and an outer surface of the first part of the rotating body in an axial direction of the axial member, and
a second stepped part between the outer surface of the third part of the rotating body and an outer surface of the second part of the rotating body in the axial direction of the axial member, and
a radial dimension of the outer surface of the third part of the rotating body is smaller than a radial dimension of the outer surface of the first part of the rotating body and a radial dimension of the outer surface of the second part of the rotating body.

5. The motor according to claim 4, wherein:
the magnet and the stator are disposed between the first bearing and the second bearing in an axial direction of the axial member.

6. The motor according to claim 4, wherein
the rotating body includes a first end part and a second end part in the axial direction of the axial member;
the first bearing is fixed to the first part of the rotating body at the first end part side, and the second bearing is fixed to the second part of the rotating body at the second end part side.

7. A rotating device comprising:
an attached member,
a motor fixed to the attached member,
the motor includes a first bearing, a second bearing, a tubular member surrounding the first bearing and the second bearing and a magnet, a stator core,
the tubular member of the motor includes a first part supported by the first bearing, a second part supported by the second bearing, and a third part between the first part and the second part,
the stator core and the magnet are arranged at a position of the third part of the tubular member in an axial direction of the tubular member,
an outer surface of the tubular member includes
a first stepped part between an outer surface of the third part of the tubular member and an outer surface of the first part of the tubular member in an axial direction of the tubular member, and
a second stepped part between the outer surface of the third part of the tubular member and an outer surface of the second part of the tubular member in the axial direction of the tubular member,
a radial dimension of the outer surface of the third part of the tubular member is smaller than a radial dimension of the outer surface of the first part of the tubular member and a radial dimension of the outer surface of the second part of the tubular member.

8. The motor according to claim 7, wherein
a radial dimension of the magnet is smaller than a radial dimension of the first bearing and a radial dimension of the second bearing.

* * * * *